(12) United States Patent
Toshine et al.

(10) Patent No.: US 7,101,644 B2
(45) Date of Patent: *Sep. 5, 2006

(54) HOLOGRAM TRANSFER FOIL

(75) Inventors: Tetsuya Toshine, Tokyo (JP); Hiroyuki Ohtaki, Tokyo (JP); Kenji Ueda, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/885,944

(22) Filed: Jun. 22, 2001

(65) Prior Publication Data

US 2002/0015897 A1 Feb. 7, 2002

(30) Foreign Application Priority Data

Jun. 23, 2000 (JP) ............................. 2000-188984
Jun. 30, 2000 (JP) ............................. 2000-198564

(51) Int. Cl.
*G03H 1/02* (2006.01)

(52) U.S. Cl. ....................... 430/1; 430/2; 359/2; 359/3; 283/81

(58) Field of Classification Search .................... 430/1, 430/2; 359/2, 3; 283/81; 759/2, 3
See application file for complete search history.

(56) References Cited

U.S. PATENT DOCUMENTS

| | | | | |
|---|---|---|---|---|
| 4,856,857 A | * | 8/1989 | Takeuchi et al. | 283/86 |
| 4,959,283 A | * | 9/1990 | Smothers et al. | 430/1 |
| 5,856,048 A | * | 1/1999 | Tahara et al. | 430/1 |
| 6,066,378 A | * | 5/2000 | Morii et al. | 283/81 |
| 6,337,752 B1 | * | 1/2002 | Heckenkamp et al. | 359/2 |
| 6,447,979 B1 | * | 9/2002 | Hattori et al. | 430/270.1 |
| 2001/0046630 A1 | * | 11/2001 | Toshine et al. | 430/1 |

FOREIGN PATENT DOCUMENTS

| CA | 2046711 | * | 1/1992 |
|---|---|---|---|
| WO | 00/35662 | * | 6/2000 |

* cited by examiner

*Primary Examiner*—Martin Angebranndt
(74) *Attorney, Agent, or Firm*—Sughrue Mion, PLLC

(57) ABSTRACT

The invention provides a hologram transfer foil comprising a substrate and a transfer layer laminated thereon, said transfer layer comprising a surface protective layer, a thermoplastic resin layer, a hologram layer and a heat seal layer in this order. The hologram transfer foil is applied on the heat seal layer side to an application member. In this case, a peel force between the substrate and the surface protective layer is smaller than that between adjacent layers in other layers. This hologram transfer foil enables a hologram image, etc. to be reconstructed in an uninterrupted manner, and is improved in terms of transferability and productivity.

3 Claims, 1 Drawing Sheet

HOLOGRAM TRANSFER FOIL

BACKGROUND OF THE INVENTION

The present invention relates to a hologram transfer foil which enables a hologram image, etc. to be reconstructed in an uninterrupted manner, and is improved in terms of transferability as well.

A hologram provides a means capable of recording information in its thickness direction, and recording and reconstructing three-dimensional images. Holograms are now fabricated by known fabrication processes. Typically, the holograms are used for prevention of illegal copying of ID cards, bank cards, etc., because they are fabricated by precise operations using optical equipment and so are very difficult to fake. In addition, the holograms are expressed in interference colors of light and so have an outside appearance hardly achievable by other imaging means.

In a typical application taking full advantage of the aforesaid features of holograms, a hologram adhesive label, obtained in a film form with an adhesive attached thereto, is applied to a variety of associated members. Such a hologram adhesive label has a multilayer structure generally comprising a release sheet/adhesive layer/hologram layer/surface protective layer/substrate. The surface protective layer is provided for the purpose of protecting the hologram recorded in the hologram layer. Usually, such a surface protective layer contains various additives with a view to imparting thereto hard coatability, printability, slip capability, etc. However, the direct provision of such a surface protective layer onto the hologram layer is not preferable for both a transfer foil and an application member with a hologram transferred thereto by the transfer foil, because the migration of low-molecular-weight components such as solvents and surfactants from the surface protective layer into the hologram layer or the migration of low-molecular-weight components such as monomers and solvents in the hologram layer causes disorder in the reconstructed hologram image, etc.

A primary of the present invention is to provide a hologram transfer foil which enables a hologram image, etc. to be reconstructed in an uninterrupted manner, and is improved in terms of transferability as well.

SUMMARY OF THE INVENTION

According to the present invention, there is provided a hologram transfer foil characterized by comprising a substrate and a transfer layer laminated thereon, said transfer layer comprising a surface protective layer, a thermoplastic resin layer, a hologram layer and a heat seal layer in this order, wherein when said hologram transfer foil is applied on said heat seal layer side to an application member, a peel force between said substrate and said surface protective layer is smaller than that between adjacent layers in other layers.

The hologram transfer foil of the present invention is characterized in that said thermoplastic resin layer is a heat-sealable, water-soluble adhesive layer. It is herein appreciated that the term "water-soluble adhesive" also includes an emulsion type adhesive.

The hologram transfer foil of the present invention is characterized in that said thermoplastic resin layer has a softening point of 55° C. or higher while said heat seal layer has a softening point of 50° C. or higher, and the softening point of said thermoplastic resin layer is at least 5° C. higher than the softening point of said heat seal layer.

The hologram transfer foil of the present invention is characterized in that said thermoplastic resin layer and said heat seal layer are each dry laminated on said hologram layer.

The hologram transfer foil of the present invention is characterized in that said hologram layer is a volume hologram layer.

The hologram transfer foil of the present invention is characterized in that said hologram layer is a surface relief hologram layer.

The hologram transfer foil of the present invention is characterized by further comprising a release sheet laminated on the surface of said heat seal layer.

The hologram transfer foil of the present invention enables a hologram image, etc. to be reconstructed in an uninterrupted manner, and is improved in releasability from the substrate and, hence, transferability and productivity.

DESCRIPTION OF THE PREFERRED EMBODIMENTS

Figure 1:
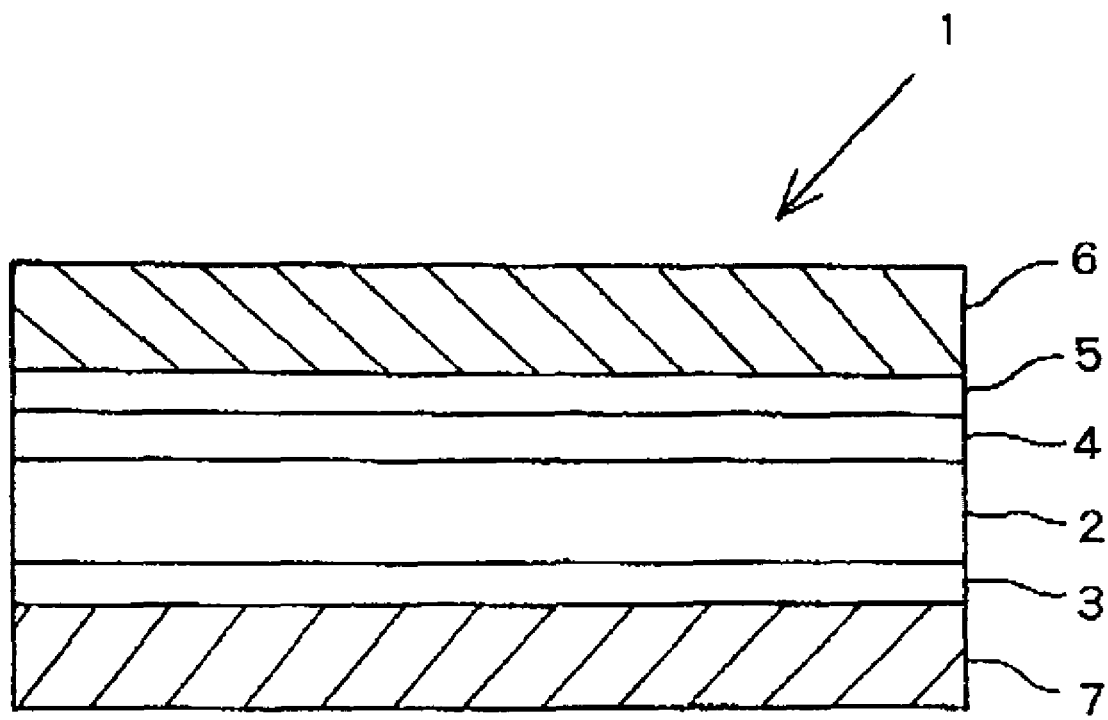
FIG. 1 is illustrative in section form of one embodiment of the transparent hologram transfer foil of the present invention.

A section of one embodiment of the hologram transfer foil of the present invention is shown in FIG. 1 wherein reference numeral 1 represents a hologram transfer foil, 2 a hologram layer, 3 a heat seal layer, 4 a thermoplastic resin layer, 5 a surface protective layer, 6 a substrate, and 7 a releasable sheet. Although not illustrated, the heat seal layer 3 may be a colored heat seal layer, as will be described later.

Reference is now made to the substrate forming part of the hologram transfer foil according to the present invention and the material forming each layer. The hologram layer 2 may be made up of either a volume hologram or a surface relief hologram. An account is given of the case where the hologram layer 2 is made up of a volume hologram layer. To fabricate a volume hologram, a volume hologram-forming material is coated on a temporary substrate to form a hologram-forming layer. Then, interference fringes equivalent to the wavefronts of light from an object are recorded in the hologram-recording layer in the form of transmittance modulation or refractive index modulation. For replication, the hologram-recording layer should be in close contact with a master volume hologram, followed by exposure and development.

For the volume hologram layer-forming material, all known volume hologram-recording materials inclusive of silver salts materials, dichromated gelatin emulsions, photo-polymerizable resins and photo-crosslinkable resins may be used. In particular, preference is given to photosensitive materials designed for recording of dry volume holograms, comprising a matrix polymer, a photo-polymerizable compound, a photo-polymerization initiator and a sensitizing dye.

The photo-polymerizable compounds used herein, for instance, include photo-polymerizable, photo-linkable monomers, oligomers and prepolymers, each containing at least one ethylenical unsaturated bond per molecule as will be explained later, which may be used alone or in admixture. Exemplary compounds are unsaturated carboxylic acids or their salts, esters of unsaturated carboxylic acids and aliphatic polyvalent alcohol compounds, and amide combined products of unsaturated carboxylic acids and aliphatic polyvalent amine compounds.

Exemplary unsaturated carboxylic acid monomers are acrylic acid, methacrylic acid, itaconic acid, crotonic acid, isocrotonic acid and maleic acid as well as their halogen-substituted unsaturated carboxylic acids such as chlorinated unsaturated carboxylic acids, brominated unsaturated carboxylic acids and fluorinated unsaturated carboxylic acids. Examples of the salts of unsaturated carboxylic acids are sodium, potassium or like salts of the aforesaid acids.

The ester monomers of aliphatic polyvalent alcohol compounds and unsaturated carboxylic acids may include those classified as acrylic acid esters, for instance, ethylene glycol diacrylate, triethylene glycol diacrylate, 1,3-butanediol diacrylate, tetramethylene glycol diacrylate, propylene glycol diacrylate, neopentyl glycol diacrylate, trimethylolprpane triacrylate, trimethylolpropane tri (acryloyloxypropyl) ether, trimethylolethane triacrylate, hexanediol diacrylate, 1,4-cyclohexanediol diacrylate, tetraethylene glycol diacrylate, pentaerythritol diacrylate, pentaerythritol triacrylate, pentaerythritol tetraacrylate, dipentaerythritol diacrylate, dipentaerythritol triacrylate, dipentaerythritol tetraacrylate, dipentaerythritol hexaacrylate, sorbitol triacrylate, sorbitol tetraacrylater sorbitol pentaacrylate, sorbitol hexaacrylate, tri (acryloyloxyethyl) isocyanurate, polyester acrylate oligomer, 2-phenoxyethyl acrylate, 2-phenoxyethyl methacrylate, phenol ethoxylate monoacrylate, 2-(p-chlorophenoxy) ethyl acrylate, p-chlorophenyl acrylate, phenyl acrylate, 2-phenylethyl acrylate, (2-acryloxyethyl) ether of bisphenol A, ethoxylated bisphenol A diacrylate, 2-(1-naphthyloxy) ethyl acrylate, o-biphenyl methacrylate and o-biphenyl acrylate.

The ester monomers of aliphatic polyvalent alcohol compounds and unsaturated carboxylic acids may include those classified as methacrylic acid esters, for instance, tetramethylene glycol dimethacrylate, triethylene glycol dimethacrylate, neopentyl glycol dimethacrylate, trimethylolpropane trimethacrylate, trimethylolethane trimethacrylate, ethylene glycol dimethacrylate, 1,3-butanediol dimethacrylate, hexanediol dimethacrylate, pentaerythritol dimethacrylate, pentaerythritol trimethacylate, pentaerythritol tetramethacrylate, dipentaerythritol dimethacrylate, dipentaerythritol hexamethacrylate, sorbitol trimethacrylate, sorbitol tetramethacrylate, bis-[p-3-methacryloxy-2-hydroxypropoxy) phenyl]dimethylmethane, bis-[p-(acryloxyethoxyphenyl] dimethylmethane, 2,2-bis(4-methacryloyloxyphenyl) propane, and mehacrylic acid-2-naphthyl.

The ester monomers of aliphatic polyvalent alcohol compounds and unsaturated carboxylic acids may include those classified as itaconic acid esters, for instance, ethylene glycol diitaconate, propylene glycol diitaconate, 1,3-butanediol diitaconate, 1,4-butanediol diitaconate, pentaerythritol diitaconate and sorbitol tetraitaconate. The ester monomers of aliphatic polyvalent alcohol compounds and unsaturated carboxylic acids may include those classified as crotonic acid esters, for instance, ethylene glycol isocrotonate, tetramethylene glycol dicrotonate, pentaerythritol dicrotonate, and sorbitol tetraocrotonate. The ester monomers of aliphatic polyvalent alcohol compounds and unsaturated carboxylic acids may include those classified as isocrotonic acid esters, for instance, ethylene glycol diisocrotonate, pentaerythritol diisocrotonate, and sorbitol tetraisocrotonate.

The ester monomers of aliphatic polyvalent alcohol compounds and unsaturated carboxylic acids may include those classified as maleic acid esters, for instance, ethylene glycol dimaleate, triethylene glycol dimaleate, pentaerythritol dimaleate, and sorbitol tetramaleate. The halogenated unsaturated carboxylic acids, for instance, include 2,2,3,3-tetrafluoropropyl acrylate, 1H,1H,2H,2H-heptadecafluorodecyl acrylate, 2,2,3,3-tetrafluoropropyl methacrylate, 1H,1H,2H,2H-heptadecafluorodecyl methacrylate, methacrylic acid-2,4,6-tribromophenyl, dibromoneopentyl dimethacrylate (available under the trade name of NK Ester DBN, Shi-Nakamura Chemical Industries, Ltd.), dibromopropyl acrylate (available under the trade name of NK Ester A-DBP, Shin-Nakamura Chemical Industries, Ltd.), dibromopropyl methacrylate (available under the trade name of NK Ester DBP, Shin-Nakamura Chemical Industries, Ltd.), methacrylic acid chloride, methacrylic acid-2,4,6-trichlorophenyl, p-chlorostyrene, methyl-2-chloroacrylate, ethyl-2-chloroacrylate, n-butyl-2-chloroacrylate, tribromophenol acrylate, and tetrabromophenol acrylate.

The amides of unsaturated carboxylic acids and aliphatic polyvalent amine compounds, for instance, may include methylenebisacrylamide, methylenebismethacrylamide, 1,6-hexaethylenebisacrylamide, 1,6-hexamethylene-bismethacrylamide, diethylenetriaminetrisacrylamide, xylylenebisacrylamide, xylylenebismethacrylamide, N-phenylmethacrylamide, and diacetone acrylamide.

Besides, the photo-polymerizable compounds may include polyisocyanate compounds having two or more isocyanate groups per molecule, as described in JP-B 48-41708, vinylurethane compounds having two or more polymerizable vinyl groups per molecule, with the addition thereto of a hydroxyl group-containing vinyl monomer represented by $CH_2=C(R)COOCH_2CH(R')OH$ where R and R' each stand for a hydrogen atom or a methyl group), etc.

Urethane acrylates as set forth in JP-A 51-37193, and polyester acrylates, epoxy resins and polyfunctional acrylates or methacrylates such as (meth)acrylic acids as shown in JP-A 48-64183 and JP-B's 49-43191 and 52-30490, respectively, may also be used in the present invention.

In addition, compounds referred to as photo-curable monomers and oligomers in The Journal of Adhesion Society of Japan, Vol. 20, No. 7, pp. 33–308 (1984) may be used.

For the photo-polymerizable compounds used herein, use may further be made of phosphorus-containing compounds such as mono(2-acryloyloxyethyl) acid phosphate (available under the trade name of Light Ester PA, Kyoeisha Oil & Fat Chemical Industries, Ltd. mono(2-methacryloyloxyethyl) acid phosphate (available under the trade name of Light Ester PM, Kyoeisha oil & Fat Chemical Industries, Ltd.), and epoxy acrylate compounds (available under the trade names of Ripoxy VR-60 and Ripoxy VR-90, Showa Polymer Co., Ltd.).

For the photo-polymerizable compounds used herein, use may further be made of commercial products available under the trade names of NK Ester M-230G and NE Ester 23G, Shin-Nakamura Chemical Industries, Ltd.).

Use may further be made of triacrylates having the following structural forulae and available under the trade names of Alonix Me315 and Alonix M-325, Toa Synthesis Chemical Industries, Ltd.):

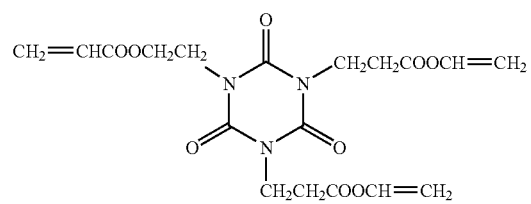

Alonix M-315

-continued

Alonix M-325

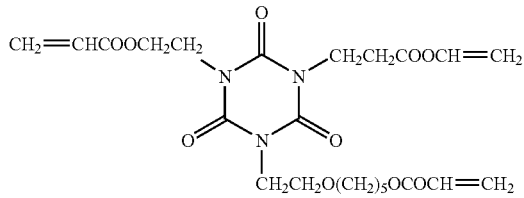

Use may further be made of 2,2'-bis(4-acryloxy-diethoxyphenyl)propane (available under the trade name of NK Ester A-BPE-4, Shin-Nakamura Chemical industries, Ltd.), tetramethylolmethane tetraacrylate (available under the trade name of NK Ester A-TMMT, Shin-Nakamura Chemical Industries, Ltd.), etc.

If required, the plasticizer may be used herein. For instance, use may be made of polyvalent alcohols such as ethylene glycol, diethylene glycol, triethylene glycol, glycerin and trimethylolpropane; phthalate plastisizers such as dimethyl phthalate (DMP), diethyl phthalate (DEP), dibutyl phthalate (DBP), heptylnonyl phthalate (HNP), (di-2-ethylhexyl)phthalate (COP), di-n-octyl phthalate (DNOP), di-i-octyl phthalate (DCapP), 79 alkyl phthalate (D79P), di-i-decyl phthalate (DIDP), ditridecyl phthalate (DTDP), dicyclohexyl phthalate (DCHP), butylbenzyl phthalate (BDP), ethylphthalyl-ethyl glycolate (EPEG) and butylphthalyl-butyl glycolate (BPBG); aliphatic dibasic acid ester plasticizers such as (di-2-ethylhexyl)adipate (DIDA), (di-n-hexyl)azelate (DNHZ), (di-2-ethylhexyl)azelate (DOZ), dibutyl sebacate (DBS) and (d-2-ethylhexyl)sebacate (DOS); citrate plasticizers such as triethyl citrate (TEC), tibutyl citrate (TBC), acetyl triethyl citrate (ATEC) and acetyl tributyl citrate (ATBC); epoxy plasticizers such as epoxylated soybean oil; and phosphate plasticizers such as tributyl phosphate (TBP), triphenyl phosphate (TPP), tricresyl phosphate (YCP) and tripropylene glycol phosphate.

For the photo-polymerization initiator in the initiator system, for instance, 1,3-di(t-butyldioxycarbonyl)benzophenone, 3,3,4,41-tetrakis(t-butyldioxycarbonyl) benzophenone, N-phenylglycine, 2,4,6-tris(trichloromethyl)-s-triazine, 3-phenyl-5-isooxazolone, 2-mercaptobenzimidazole, and imidazole dimers may be used. In view of the stabilization of the recorded hologram, the photo-polymerization initiator should preferably be removed by decomposition after hologram recording. For instance, organic peroxide initiators are preferred because of being easily decomposed by ultraviolet irradiation.

Exemplary sensitizing dyes are those having absorption light at 350 to 600 nm such as thiopyrylium salt dyes, merocyanine dyes, quinoline dyes, styrylquinoline dyes, ketocoumarin dyes, thioxanthene dyes, xanthene dyes, oxonol dyes, cyanine dyes, rhodamine dyes, pyrylium ion dyes, and diphenylidonium ion dyes. It is here noted that it is acceptable to use sensitizing dyes having absorption light at a wavelength less than 350 nm or greater than 600 nm.

The matrix polymer used herein, for instance, includes copolymers (or a mixture thereof) comprising as a copolymerizable component selected from the group consisting of polymethacrylic acid ester or its partial hydrolysate, polyvinyl acetate or its hydrolysate, polyvinyl alcohol or its partially acetallized product, triacetyl cellulose, polyisoprene, polybutadiene, polychloroprene, silicone rubber, polystyrene, polyvinyl butyral, polyvinyl chloride, chlorinated polyethylene, chlorinated polypropylene, poly-N-vinylcarbazole or its derivative, poly-N-vinylpyrrolidone or its derivative, copolymer of styrene and maleic anhydride or its half ester, acrylic acid, acrylic acid ester, methacrylic acid, methacrylic acid ester, acrylamide, acrylnitrile, ethylene, propylene, vinyl chloride and vinyl acetate. For the matrix polymer, it is more preferable to use polyisoprene, polybutadiene, polychloroprene, polyvinyl alcohol, polyvinyl acetal that is a partially acetallized product of polyvinyl alcohol, polyvinyl butyral, polyvinyl acetate, ethylene-vinyl acetate copolymer and vinyl chloride-vinyl acetate copolymer which may be used alone or in admixture. The recorded hologram is stabilized by the step of migrating the monomers by heating. To this end, these matrix polymers have to make the migration of monomers easy.

The photo-polymerizable compound should be used in an amount of usually 10 part by weight to 1,000 parts by weight, and preferably 10 parts by weight to 100 parts by weight, per 100 parts by weight of polymer matrix. The photo-polymerization initiator should be used in an amount of usually 1 part by weight to 10 parts by weight, and preferably 5 parts by weight to 10 parts by weight, per 100 parts by weight of polymer matrix. The sensitizing dye should be used in an amount of usually 0.01 part by weight to 1 part by weight, and preferably 0,01 part by weight to 0.5 parts by weight, per 100 parts by weight of polymer matrix. Other volume hologram-forming materials, for instance, are a variety of nonionic, anionic and cationic surface active agents.

these hologram-recording materials are dissolved in a suitable solvent such as acetone, methyl ethyl ketone, methyl isobutyl ketone, cyclohexanone, benzene, toluene, xylene, chlorobenzene, tetrahydrofran, methyl cellosolve, ethyl cellosolve, methyl cellosolve acetate, ethyl cellosolve acetate, ethyl acetate, 1,4-dioxane, 1,2-dichloroethane, dichloromethane, chloroform, methanol, ethanol and isopropanol or a mixture thereof to form a coating solution having a solid content of 15% to 25%. The hologram-recording layer should have a thickness of usually 0.1 to 50 μm, and preferably 1 to 20 μm as measured after drying.

For the hologram-recording material, a photo-polymerizable composition may also be used, which comprises a binder resin, a radical photo-polymerization initiator, a cationic photo-polymerization initiator, a sensitizing dye, a radical polymerizaible monomer and a cationic polymerizable monomer.

The volume hologram-recording material of the present invention should have a glass transition temperature of at least 50° C., preferably at least 80° C., and more preferably at least 100° C., after the material with a hologram recorded therein has been fixed by heat treatment and subjected to ultraviolet treatment. It is here noted that there is no particular upper limit to the glass transition temperature. For instance, when a volume hologram laminate having such a glass transition temperature is thermally laminated on an application member at 140° C. for 1.5 seconds, there is no influence on the hologram recorded in the volume hologram layer. It is also possible to use a heat sealing agent suitable for this thermal lamination condition, so that the volume hologram laminate can be bonded to the application member with an increased adhesive strength.

Next, reference is made to another embodiment of the present invention, wherein the hologram layer is made up of a surface relief hologram layer. It is here appreciated that the relief hologram also includes a diffraction grating. For the fabrication of the surface relief hologram, for instance, a hologram-forming layer is first formed by coating a surface relief hologram-forming material on a temporary substrate. Then, a press stamper prepared from a master hologram using laser light is thermally pressed on the surface of the hologram-forming layer to form a fine relief pattern thereon. This hologram layer may be formed of every material used for conventional relief hologram-forming layers, By way of example but not by way of limitation, various resin materials such as thermosetting resins, thermoplastic resins and ionizing radiation-curing resins may be used. The thermosetting resins used herein, for instance, include unsaturated polyester resin, acrylic-modified urethane resin, epoxy-modified acrylic resin, epoxy-modified unsaturated polyester resin, alkyd resin and phenol resin, and the thermoplastic resins, for instance, include acrylate resin, acrylamide resin, nitrocellulose resin and polystyrene resin. These resins may be made up of homopolymers or copolymers comprising at least two components, and may be used alone or in combination of two or more. These resins may additionally contain various isocyanate compounds, metallic soaps such as cobalt naphthenate and zinc naphthenate, organic peroxides such as benzoyl peroxide and methyl ethyl ketone peroxide, thermal or ultraviolet curing agents such as benzophenone, acetophenone, anthraquinone, naphthoquinone, azobisisobutyronitrile and diphenyl sulfide, and so on.

The ionizing radiation-curable resins used herein, for instance, include epoxy-modified acrylate resins, urethane-modified acrylate resins and acrylic-modified polyesters. Of these, the urethane-modified acrylate resins are preferable, although the urethane-modified acrylic resin represented by the following general formula is most preferred.

General Formula

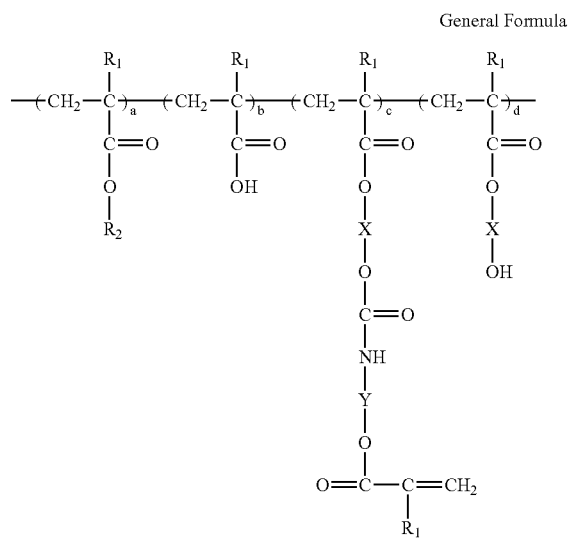

Here five $R_1$'s are each independently a hydrogen atom or a methyl group, $R_2$ is a $C_{1-16}$ hydrocarbon group, and X and Y are each a straight- or branched-chain alkylene group. On the premise that $(a+b+c+d)=100$, a is an integer of 20 to 90, b is an integer of 0 to 50, c is an integer of 10 to 80, and d is an integer of 0 to 20.

One preferable example of the aforesaid urethane-modified resin is obtained by the reaction of methacryloyloxyethyl isocyanate (2-isocyanate ethyl methacrylate) with hydroxyl groups present in an acrylic copolymer obtained by the copolymerization of 20 to 90 moles of methyl methacrylate, 0 to 50 moles of methacrylic acid and 10 to 80 moles of 2-hydroxyethyl methacrylate.

Thus, it is not required that the aforesaid methacryloyloxyethyl isocyanate react with all the hydroxyl group present in the copolymer; that is, only the reaction of methacryloyloxyethyl isocyanate with at least 10 mol %, and preferably at least 50 mol % of hydroxyl groups in the 2-hydroxyethyl methacrylate in the copolymer is needed. In place of or in combination with the aforesaid 2-hydroxyethyl methacrylate, hydroxyl-containing monomers may be used, for instance, N-methylolacrylamide, N-methylolmethacrylamide, 2-hydroxyethyl acrylate, 2-hydroxyethyl methacrylate, 2-hydroxypropyl acrylate, 2-hydroxyethyl methacrylate, 4-hydroxybutyl acrylate and 4-hydroxybutyl methacrylate.

For instance, when a diffraction grating or the like is formed by a resin composition comprising as its main component the urethane-modified acrylic resin with many methacryloyl groups introduced in its molecule using the hydroxyl groups present in the hydroxyl group-containing acrylic resin, as mentioned above, it is possible to use ionizing radiation such as ultraviolet rays or electron beams as curing means. In addition, the resultant diffraction grating or the like is much more improved in flexibility, heat resistance, etc., albeit having a high crosslinking density.

The aforesaid urethane-modified acrylic resin may be obtained by dissolving the aforesaid copolymer in a solvent such as toluene, ketone, cellosolve acetate or dimethyl sulfoxide to prepare a solution. While the solution is stirred, the methacryloyloxyethyl isocyanate is added dropwise thereto for the reaction of the isocyanate group with hydroxyl groups in the acrylic resin, yielding an urethan bond, through which the methacryloyl group can be introduced in the resin. Referring here to the amount of the methacryloyloxyethyl isocyanate used, the isocyanate group is used in an amount of 0.1 to 5 moles, and preferably 0.5 to 3 moles per hydroxyl group in the acrylic resin. It is then appreciated that when the methacryloyloxyethyl isocyanate is used in excess of the equivalent or the hydroxy groups In the aforesaid resin, there is a possibility that a —CONH—$CH_2CH_2$— bond may occur through the reaction of said methacryloyl-oxyethyl isocyanate with carboxyl groups in the resin.

While the present invention has been described with reference to the cases where all $R_1$'s and $R_2$ are methyl groups and both X and Y are ethylene groups, it is understood that the present invention is not limited thereto. For instance, the present invention also includes the cases where five $R_1$'s are each independently a hydrogen atom or a methyl group, $R_2$ is a methyl group, an ethyl group, an n- or iso-propyl group, an n-, iso- or tert-butyl group, a substituted or unsubstituted phenyl group, and a substituted or unsubstituted benzyl group, and X and Y are each an ethylene group, a propylene group, a diethylene group, and a dipropylene group. The thus obtained urethane-modified acrylic resin should have an overall weight-average molecular weight of 10,000 to 200,000, and preferably 20,000 to 40,000 as measured by GPC on a standard polystyrene weight basis.

When such an ionizing radiation-curing resin is cured, the aforesaid monomers may be used in combination with such mono- or poly-functional monomers or oligomers as mentioned below for the purpose of control of crosslinked structure, viscosity, etc.

Exemplary monofunctional monomers are mono(meth) acrylates such as tetrahydrofurfuryl (meth)acrylate, hydroxyethyl (meth)acrylate, vinyl pyrrolidone, (meth)acryloyloxyethyl succinate and (meth)acryloyloxyethyl phthalate. As classified in terms of skeleton structure, di- or poly-functional monomers include polyol (meth)acrylates such as epoxy-modified polyol (meth)acrylate, lactone-modified polyol (meth)acrylate, polyester (meth)acrylate, epoxy (meth)acrylate and urethane (meth)acrylate, and other poly (meth)acrylates having polybutadiene, isocyanuric acid, hydantoin, melamine, phosphoric acid, imide and phosphazine skeletons. Thus, various monomers, oligomers and polymers capable of being cured by ultraviolet radiation and electron beams may be used.

To be more specific, exemplary difunctional monomers and oligomers include polyethylene glycol di(meth)acrylate, polypropylene glycol di(meth)acrylate, neopentyl glycol di(meth)acrylate and 1,6-hexanediol di(meth)acrylate, and exemplary trifunctional monomers, oligomers and polymers are trimethylolpropane tri( meth)acrylate, pentaerythritol tri(meth)acrylate and an aliphatic tri(meth)acrylate. Exemplary tetrafunctional monomers, oligomers and polymers include pentaerythritol tetra(meth)acrylate, ditrimethylolpropane tetra(meth)acrylate and an aliphatic tetra(meth) acrylate. Exemplary penta- or poly-functional monomers, oligomers and polymers include dipentaerythritol penta(meth)acrylate and dipentaerythritol hexa(meth)acrylate. Besides, (meth)acrylates having polyester, urethane and skeletons may be used. Although the number of functional groups is not critical, it is appreciated that the number of functional groups of less than 3 makes heat resistance likely to become low, and the number of functional groups exceeding 20 makes flexibility likely to become low. It is thus preferred that the number of functional groups be in the range of 3 to 20.

To form a relief hologram in the hologram-forming layer composed of the aforesaid materials, a press stamper with a relief pattern formed on its surface is pressed against the surface of the holgoram-forming layer to transfer the relief pattern onto the surface of the hologram-forming layer. Preferably in this case, a release agent should be previously incorporated in the hologram-forming layer so as to provide an easy release of the hologram-forming layer from the press stamper. For this release agent, use may be made of any of release agents known so far in the art, for instance, solid waxes such as polyethylene wax, amide wax and teflon powders, surface active agents based on fluorine and phosphoric ester, and silicone. Particularly preferred release agents are modified silicones inclusive of (1) a side chain type modified-silicone oil, (2) a both-terminated modified-silicone oil, (3) a one-terminated type modified silicone oil, (4) a both side-terminated type modified silicone oil, (5) methylpolysiloxane containing trimethylsiloxysilicic acid (called silicone resin), (6) silicone graft acrylic resin, and (7) methylphenyl silicone oil.

The modified silicone oils are generally broken down into reactive silicone oils and non-reactive silicone oils. The reactive silicone oils, for instance, include those modified by such groups as amino, epoxy, carboxyl, carbinol, methacryl, mercapto, reactive (at one end), and foreign functional groups, and the non-reactive silicone oils, for instance, include those modified by polyether, methylstyryl, alkyl, higher fatty acid ester, hydrophilic group, higher alkoxy, higher fatty acid, and fluorine.

Of the aforesaid silicone oils, particular preference is given to that of the type having a group capable to reacting with the film-forming component in the hologram-forming layer. This is because such silicone oil reacts with the film-forming component as the hologram-forming layer cures, so that it is bonded thereto. For this reason, this silicone oil is unlikely to bleed out on the surface of the hologram layer with the relief pattern formed thereon, so that unique performance can be imparted to the hologram layer. In particular, this silicone oil is effective for improvements in the adhesion of the hologram layer to a deposited layer at an evaporation step. Such a surface relief hologram layer as mentioned above has a thickness of usually 0.1 to 50 μm, and preferably 1 to 20 μm.

For such a surface relief hologram, a reflective layer should preferably be formed on the relief interference fringe pattern. When a light reflective metal thin film is used for the reflective layer, an opaque hologram is obtained, and when a transparent substance different in the index of refraction from the hologram layer is used, a transparent hologram is obtained. In the present invention, both the reflective layers may be used. The reflective layer may be formed by known processes inclusive of sublimation, vacuum evaporation, sputtering, reactive sputtering, ion plating, and electroplating.

For the light reflective layer, for instance, use may be made of thin films of metals such as Cr, Ti, Fer Co, Ni, Cu, Ag, Au, Ge, Al, Mg, Sb, Pb, Pd. Cd, Bi, Sn, Se, In, Ga and Rb and their oxides and nitrides, which may be used alone or in combination of two or more. Of these, thin films of Al, Cr, Ni, Ag and Au are especially preferred with a thickness of 1 to 10,000 nm, and preferably 20 to 200 nm.

The thin film to form the transparent type hologram may be made of any desired material provided that it is of light transparency enough to produce a hologram effect. For instance, the thin film may be formed using a transparent material having a refractive index different from that of the resin for the hologram-forming layer. Although the refractive index of this transparent material may be higher or lower than that of the resin for the hologram-forming layer, it is understood that the refractive index difference is preferably at least 0.1, more preferably at least 0.5, and more preferably at least 1.0. Besides, metallic reflective films of up to 20 nm in thickness may be used. The transparent type reflective layer preferably used herein includes a titanium oxide ($TiO_2$) film, a zinc sulfide (ZnS) film, and a Cu—Al composite metal oxide film.

The hologram layer has been explained. The hologram transfer foil of the present invention is designed to be applied onto an application member by thermo-compression transfer. Thus, the relations between the heat resistance of the hologram-recording material and the transfer conditions should be appropriately determined in such a way that there is no influence on the hologram recorded in the hologram layer.

Having the function of bonding the hologram layer 2 to an application member in a heat-sensitive fashion, the heat seal layer 3 is provided on one surface of the hologram layer 2 obtained as mentioned above (via the reflective layer where the hologram layer is of the surface relief type). The heat seal layer 3 comprises a heat-sensitive adhesive based on thermoplastic resins such as ethylene-vinyl acetate copolymer resins, polyamide resins, polyester resins, polyethylene resins, ethylene-isobutyl acrylate copolymer resins, butyral resins, polyvinyl acetate resins and their copolymer resins, cellulose derivatives, polymethyl methacrylate resins, polyvinyl ether resins, polyurethane resins, polycarbonate resins, polypropylene resins, epoxy resins, phenol resins, thermoplastic elastomers such as SBS, SIS, SEBS and SEPS, and reactive hot melt resins. In consideration of adhesion to the application member, an appropriate selection may be made from these resins. Exemplary application members are a polyvinyl chloride sheet, a polystyrene sheet, a PET sheet and a high-quality paper sheet. In view of adhesion to these sheets, for instance, preference is given to v200 (softening point: 85° C.), EV270 (softening point: 41° C.) and V100 (softening point; 67° C.), all made by Mitsui Chemicals, Inc., AD1790-15 (softening point: 80° C.) made by Toyo Morton Co., Ltd., U206 made by Soken Kaqaku Co., Ltd., EC1200 (softening point: 75° C.), EC1700 (softening point: 85° C.), AC3100 (softening point: 90° C.) and EC909 (softening point: 100° C.), all made by Chuo Rika Kogyo Co., Ltd., Nipporan 3038 (softening point: 135° C.) made by Nippon Polyurethane Co., Ltd., M-720AH, A-928, A-450 and A-100Z-4, all made by Dai Nippon Ink Co., Ltd.

Water-soluble thermoplastic elastomers are exemplified by EC1200 (softening point: 75° C.) and MC3800, both made by Chuo Rika Kogyo Co., Ltd., AP-60LM made by DIC, and V-100 (softening point: 67° C.) and V-200 (softening point: 85° C.), both made by Mitsui Chemicals, Inc., some of which are already referred to above.

To provide the heat seal layer 3 on the hologram layer 2, the heat-sensitive adhesive is dissolved or dispersed in a slovent solvent such as water, toluene or methyl ethyl ketone to prepare a coating solution. Then, the coating solution is coated on a temporary carrier to a post-drying thickness of 2 to 10 μm by means of a comma coater, a die coater or a gravure coater to prepare a releasable heat seal-forming layer. Finally, this heat seal-forming layer is dry laminated on the hologram layer 2 with the hologram recorded therein. It is here appreciated that when the relief hologram layer is used, the coating solution may be coated and formed directly on the reflective layer.

The heat seal layer 3 may be colorless and transparent However, when the hologram layer is a volume or transparent relief hologram layer, it is preferable to incorporate a coloring agent in the heat seal layer, because the heat seal layer provides a background for the hologram image to be observed in the case of a label, and because the heat seal layer can provide a hologram image of enhanced contrast.

For the coloring agent, pigments and dyes may be used alone or in admixture. Exemplary pigments are black pigments such as carbon black, copper-iron-manganese and Aniline Black, other colored pigments such as Naphtol Red F5RK and Phthalocyanine Blue, and infrared reflecting pigments, which may be used alone or in admixture. When a colored infrared reflecting pigment is used as the pigment, the back layer in the hologram recording layer can be placed in a state different from visible light and so can be used for prevention of illegal copying, identification papers or the like. The pigment used herein should preferably have an average particle diameter of 10 μm or less, and especially 1 μm or less. A pigment having an average particle size exceeding 10 μm is likely to make the surface of the heat seal layer irregular, and disturb the interference fringes recorded in the volume hologram layer because the volume hologram layer itself is in a soft condition. In addition, a hologram image becomes dark with pinholes scattered therein. In other words, it is desired that the heat seal layer should have a surface smoothness of ±0.5 μm or less, and preferably ±0.2 μm or less. Such a surface smoothness is easily achievable by forming the pigment-containing heat seal layer on a release film having a smooth surface, then removing the release film, and finally heat transfer the surface of the heat seal layer, from which the release film has been removed, onto the hologram layer.

Exemplary dyes are black dyes such as Acid Black, Chrome Black and Reactive Black, and dyes such as Disperse Red, Cation Blue and Cation Yellow, which may be used alone or in admixture.

The amount of the pigment or dye incorporated in the heat seal layer should be 1% by weight to 40% by weight, and preferably 10% by weight to 30% by weight. An amount exceeding 40% by weight is not preferable because of a drop of heat sealability.

The colored heat seal layer should have an O.D. value of 1.5 or greater, and preferably 1.9 or greater, and absorb at least 50%, and preferably at least 80%, of light having a diffraction wavelength through the volume hologram layer, so that a hologram image of enhanced contrast can be obtained.

The colored heat seal layer is provided on the hologram layer by dissolving or dispersing the pigment or dye together with the adhesive in a solvent such as ethyl acetate, toluene or methyl ethyl ketone, coating the resulting solution on a temporary carrier at a post-drying thickness of 0.5 μm to 100 μm, and preferably 1 μm to 50 μm by means of a comma coater, a die coater, a gravure coater or the like, and transferring the thus coated layer on the temporary carrier onto the hologram layer by thermo-compression. If the colored heat seal layer 3 is provided by transfer on a volume hologram layer, it is then possible to reduce the influence of the migration of the solvent or dye to the hologram recorded in the hologram layer.

Alternatively, the colored heat seal layer 3 may have a multilayer structure made up of, in order from the volume hologram layer, a colored sub-layer and a heat seal sub-layer. In this case, the colored heat seal layer 3 is applied on the heat seal sub-layer to the application member.

The colored sub-layer may he constructed of an ink layer comprising a binder and a coloring agent. For the binder, any desired material having adhesion to both the hologram layer and the heat seal layer may be used. For instance, use may be made of polyurethane resins, polyester resins, polyacrylic resins, vinyl chloride resins, vinyl acetate resins, vinyl chloride-vinyl acetate copolymer resins, polyolefin resins, ethylene-vinyl acetate copolymer resins, styrene-butadiene copolymer resins, and polyamide resins.

For the coloring agent in the colored sub-layer, the aforesaid pigments or dyes 4 may be used alone or in admixture. The content of the pigment or dye in the colored sub-layer is 1% by weight to 40% by weight and preferably 10% by weight to 30% by weight, and is larger than that in the colored heat seal layer. The colored sub-layer should preferably have an O.D. value of at least 1.5 and especially at least 1.9, and absorb at least 50%, and especially at least 80%, of light having a diffraction wavelength through the volume hologram layer, so that a hologram image of much better contrast can be obtained.

To obtain the colored sub-layer, the pigment or dye is dispersed in a binder to form an ink. Then, the ink is coated on the second heat seal layer 4" at a post-drying thickness of 0.5 μm to 100 μm, and preferably 1 μm to 50 μm by means of a comma coater, a die coater or a gravure coater. The colored sub-layer should preferably be formed on the heat seal sub-layer to be described later by coating the ink directly thereon.

The heat seal sub-layer provided together the colored sub-layer should preferably be formed using the solvent type adhesive mentioned with reference to the colored heat seal layer. The adhesive is diluted by a diluent to a viscosity capable of coating, and is coated on the releasable sheet 7 at a post-drying thickness of 0.5 μm to 100 μm, and preferably 1 μm to 50 μm by means of a comma coater, a die coater or a gravure coater. Thus, the heat seal sub-layer and colored sub-layer are successively formed by coating on the releasable sheet 7. Then, the colored heat seal layer is thermo-compressed and transferred on the colored sub-layer side onto the hologram layer.

Alternatively, a multilayer structure comprising the release sheet 7 with a heat seal layer, a colored layer and a heat seal layer formed thereon in this order is laminated on the second heat seal side over the volume hologram layer, followed by thermo-compression transfer. When the hologram layer is a volume hologram layer, it is preferable to use a water-soluble, heat-sensitive adhesive for the heat seal layer in contact with the hologram layer, because it is possible to prevent the migration of the solvent in the heat seal layer and the coloring component in the colored layer into the volume hologram layer. In addition, the first heat seal layer in contact with the release sheet 7 is especially useful for illegal hologram replacement because its adhesion to the application member is improved due to the absence of any coloring agent.

While the colored layer is formed by coating in consideration of ease with which the hologram transfer foil can be torn off, it is noted that the colored layer may be a colored film. In this case, the colored film may have been slit or otherwise nicked in such a way as to easily tear off the hologram transfer foil.

A light reflective layer may also be used as the colored layer. For the light reflective layer, it is preferable to use a metal thin layer capable of reflecting light. The light reflective layer may be formed by known processes such as sublimation, vacuum evaporation, sputtering, reactive sputtering, ion plating, and electroplating. For instance, use may be made of thin films of metals such as Cr, Ti, Fe, Co, Ni, Cu, Ag, Au, Ge, Al, Mg, Sb, Pb, Pd, Cd, Di, Sn, Se, In, Ga and Rb and their oxides and nitrides, which may be used alone or in combination of two or more. Of these, thin films of Al, Cr, Ni, Ag and an are especially preferred with a thickness of 1 to 10,000 nm, and preferably 20 to 200 nm. With such a metal thin film it is possible to improve the visibility and design of a hologram image.

The thermoplastic resin layer 4 is provided for the purposes of bonding the surface protective layer 5 to the hologram layer 2 in a heat-sensitive fashion and preventing the migration of low-molecular-weight components such as organic solvents and surfactants from the surface protective layer to the hologram layer and the migration of low-molecular-weight components such as monomers and organic solvent from the hologram layer to the surface protective layer. It is preferable to form this thermoplastic resin layer using a heat-sensitive adhesive, and especially a water-soluble, heat-sensitive adhesive. For instance, the resins as set forth in connection with the aforesaid heat seal layer may be used.

To transfer the thermoplastic resin layer 4 on the hologram layer by means of dry lamination, the resin is dissolved or dispersed in water or a solvent to prepare a coating solution. Then, the coating solution is coated on a temporary carrier by means of a comma coater, a die coater, a gravure coater or the like to form a barrier layer having a post-drying thickness of 0.5 μm to 10 μm.

For the hologram transfer foil of the present invention, it is preferable that the thermoplastic resin layer has a softening point of 55° C. or higher and especially 55° C. to 200° C., and the heat seal layer has a softening point of 50° C. or higher and especially 50° C. to 195° C. A thermoplastic resin layer having a softening point lower than that of the heat seal layer is not preferred because misalignment, etc. occur due to melting, etc. during transfer. It is thus preferred that the softening point of the thermoplastic resin layer is at least 5° C., preferably at least 10° C. lower than that of the heat seal layer.

The surface protective layer 5 must have adhesion to the thermoplastic resin layer 4 and releasability from the substrate 6. After the substrate 6 is released off, the surface protective layer 5 cooperates with the thermoplastic resin layer to serve as a protective layer 2 for the hologram layer 2. Comprising a methacrylic resin such as polymethyl methacrylate as a main binder, the surface protective layer is required to have functions such as hard coatability, printability and slip capability because it must serve as a protective layer for the volume hologram layer 2. To achieve such functions, various additives are incorporated in the surface protective layer. For the binder, polyacrylate resins, polyvinyl chloride resins, cellulose resins, silicone resins, chlorinated rubber, casein, etc. may also be used. For the additives, use may be made of surface active agents, waxes and metal compounds which may be used alone or in admixture.

The surface protective layer 5 should preferably be formed using a material selected in such a way as to provide a peel force of 0.001 to 0.1 kgf/25 mm (90° peeling), and preferably 0.001 to 0.005 kgf/25 mm with respect to the substrate 6. The peel force between the surface protective layer 5 and the substrate 6 should be set such that when the hologram transfer toil of the present invention is applied on the heat seal layer side over an application member, it becomes smaller than that between adjacent layers in the multilayer structure, viz., between the surface protective layer and the thermoplastic resin layer, between the thermoplastic resin layer and the hologram layer, between the hologram layer and the heat seal layer, and between the heat seal layer and the application member. To form the surface protective layer, the starting composition is dissolved in an organic solvent to prepare an ink. Then, this ink is coated on the substrate 6 by known means such as coating. In consideration of releasability, tear capability and surface protection, the surface protective layer should preferably have a thickness of 0.1 μm to 3 μm.

For the substrate 6, for instance, use may be made of polyethylene terephthalate (PET) films, polyvinyl chloride (PVC) films, polyvinylidene chloride films, polyethylene films, polypropylene films, polycarbonate films, cellophane films, acetate films, nylon films, polyvinyl alcohol films, polyamide films, polyamide-imide films, ethylene-vinyl alcohol copolymer films, polymethyl methacrylate (PMMA) films, polyether sulfone films and polyether ether ketone (PEEK) films. The substrate 6 has a thickness of usually about 5 to 200 μm, and preferably 10 to 50 μm, and may be either transparent or opaque. However, the substrate should be colored and opaque because where the hologram transfer foil of the present invention is applied over the application member to obtain a hologram seal, the hologram layer can be well protected, and because the substrate can be prevented from being left behind without being removed. The substrate may be used in a sheet or carrier tape form.

In the hologram transfer foil of the present invention, the substrate 6 may have been subjected to surface release treatment or the like. However, the substrate 6 must support the hologram foil before the transfer hologram foil of the invention is applied over the application member, and so must be bonded onto the surface protective layer with a certain adhesive force. When the hologram transfer foil of the invention is applied over the application member, on the other hand, the substrate 6 must be released from the surface protective layer. It is thus desired that, as will be described later, the adhesion and releasability of the substrate be controlled by making use of the releasability of the surface protective layer.

For the releasable sheet 7 provided on the heat seal layer 3, use may be made of ordinarily used release paper as well as releasable films obtained by treating films such as polyethylene terephthalate or polypropylene films with releasing agents based on fluorine, silicone or the like. It is noted that even when no releasable sheet 7 is provided, a sheet form of hologram transfer foil 1 may be superposed on itself or a continuous form of label may be rolled up. In this case, too, the heat seal layer has no adhesion to the upper surface of another label superposed thereon. Nonetheless, it is preferable to laminate the releasable sheet 7 on the heat seal layer because the surface of the heat seal layer can be surely protected during storage of hologram transfer foil 1.

One embodiment of how to fabricate the hologram transfer foil of the present invention is now explained.

A first multilayer film (1) comprising a PET film/hologram layer 2 with a relief or volume hologram recorded therein/film with the surface subjected to releasing treatment, a second multilayer film (2) comprising a surface protective layer 5/substrate 6, a third multilayer film (3) comprising a thermoplastic resin layer 4/film with the surface subjected to releasing treatment and a fourth multilayer film (4) comprising a heat seal layer 3/releasable sheet 7 are separately prepared.

The third multilayer film is first dry laminated on its thermoplastic resin layer side over the surface protective layer of the second multilayer film at 50° C. or higher, thereby preparing a fifth multilayer film comprising a thermoplastic resin layer 4/surface protective layer 5/substrate 6.

Then, the film with the surface subjected to releasing treatment is released from the first multilayer film. Subsequently, the fifth multilayer film is dry laminated at 50° C. or higher on its thermoplastic resin layer surface over the surface of the hologram layer with the hologram recorded therein, thereby preparing a sixth multilayer film comprising a PET film/hologram layer 2/thermoplastic resin layer 4/surface protective layer 5/substrate 6.

Then, the PET film is removed from the sixth multilayer film. Finally, the fourth multilayer film is dry laminated at 50° C. or higher over the surface of the hologram layer (the surface of the reflective layer laminated on the hologram layer when the hologram layer is a relief hologram layer).

In this way, the hologram transfer foil of the present invention comprising a releasable sheet 7/neat seal layer 3/hologram layer 2/thermoplastic resin layer 4/surface protective layer 5/substrate 6 can be obtained. This hologram transfer foil can be easily fabricated without any adverse influence on the hologram, because both the thermoplastic resin layer and the heat seal layer are formed by transfer.

To transfer the hologram onto the application member using the hologram transfer foil of the present invention, the releasable sheet 7 is first removed from the hologram transfer foil. Then, the hologram transfer foil is heat laminated on the surface of the heat seal layer 3 over the application member at 50° C. or higher, and preferably 80° C. to 200° C., followed by removal of the sheet or carrier tape form of the substrate 6. In this way, a structure comprising the heat seal layer 3/hologram layer 2/thermoplastic resin layer 4/surface protective layer 5 can be formed on the surface of the application member.

For the application member to which the hologram transfer foil of the present invention may be applied, for instance, use may be made of paper, synthetic paper, plastic and metal films or sheets, glass or other transparent sheets, and opaque sheets. For instance, the hologram transfer foil of the invention may be used for plastic products made up of vinyl chloride resins, acrylic resins, polystyrene resins, polyester resins such as polyethylene terephthalate, and polycarbonate resins. It is here noted that when a transparent transfer layer is used for the hologram transfer foil, it is then possible to see the surface of the underlying application member therethrough.

Exemplary products or articles made up of these resin materials are windows, observation windows or doors of the means or facilities of transportation such as motorcars, railway trains, ships or airplanes as well as windows, doors, fixed sash windows and transoms of buildings. The hologram transfer foil of the present invention may also be applied to transparent glasses or transparent plastic sheets on the surfaces of instruments and displays located around drivers' seats, control decks or like sites in such means of transportation.

The hologram transfer foil of the present invention may be applied to the surfaces of displays of various devices such as electric appliances, clocks or watches and cameras, some being not always colorless and transparent, and some being black when put off. Such devices also include those having display functions, e.g., calculators, portable terminal equipment such as portable personal computers, portable phones, IC recorders, CD players, DVD players, MD players, video tape recorders and audio equipment. The hologram transfer foil of the invention, when it can be seen through, may applied to such devices while the hologram image of the volume hologram layer 2 can be superposed thereon without detrimental to the display functions inherent therein. To add to this, the hologram transfer foil of the invention may be applied to upscale wristwatches, jewels, noble metals, antiques or their cases for the purpose of warranting that they are genuine, taking advantage of difficulty of fabrication of the volume hologram layer 2 in the hologram transfer foil. In this case, the hologram transfer foil may be applied to such articles irrespective of whether they are transparent or opaque.

The hologram transfer foil of the present invention may be applied to sheets such as identification papers and certificates for examination, cards such as ID cards and booklets such as passports, or may be used as certificates indicating public security and health ranks for fire prevention, sterilization, etc. In principal, the hologram transfer foil of the invention may be used as equivalents to paper certifications sealed on articles that are transparent and in a substantially flat sheet or quadratic surface form. In addition, the hologram transfer foil of the invention may be applied to films or sheets made up of paper, synthetic paper, synthetic resins and metals as well as articles including glass or other parts. By taking advantage of volume hologram's unique properties of making it possible to reconstruct three-dimensional images, the hologram transfer foil of the invention may be used as labels affixed to books or saddle stitched magazines such as monthlies, automotive glass windows, premium commodity goods, etc.

The hologram image in the volume hologram layer 2 may be designed in conformity to what field and purpose it is used in and for, and may arbitrarily carry symbols and characters indicative of the necessary meanings. A hologram image itself may be obtained by recording actual objects in hologram photosensitive materials or by designing hologram diffraction gratings by calculation or processing digital images obtained using digital cameras or two- or three-dimensional images obtained from computer graphics by suitable means such as holographic stereography.

The hologram transfer foil of the present invention may have been cut in conformity to the shape of an application article or part. When the hologram transfer foil of the invention includes the releasable sheet 7, it is preferable to provide cutouts in portions of the hologram transfer foil other than the releasable sheet 7. This is because individual labels of given shape can be taken out of the hologram transfer foil that is of large size or in a rolled-up form for application to articles. Such processing may be carried out by making a notch. To make a notch only in the portions of the hologram transfer foil other than the releasable sheet 7, it is preferable to vertically move a blade at a stroke corresponding to the thickness of the releasable sheet 7. It is also preferable to remove respective layers other than the releasable sheet between adjacent hologram transfer foils, leaving individual hologram transfer foils of given shape, In this case, the releasable sheet may be provided at its boundaries with perforations along which individual hologram transfer foils are detachable.

EXAMPLES

The present invention is now explained with reference to examples. The softening point referred to hereinafter was measured by the following method.

Measuring Device: Thermomechanical Analyzer TE5A8310

THERMOPLUS 2 Series

Measuring conditions:
measuring Atmosphere: $N_2$
Measuring Temp. Range: 0 to 150° C.
Temp. Fluctuation Gradient: 5 K/min.
Indentation Load: 1.0 g

Example 1

First Multilayer Film Comprising PET Film/Hologram-recorded Volume Hologram Layer/PET Film with the Surface Subjected to Releasing Treatment A coating solution having the following composition:

| | |
|---|---|
| Photocurable resin composition for volume hologram layer formation (containing as a basic binder a polymethyl methacrylate resin (Tg: 100° C.) | 60 parts by weight |
| Methyl ethyl ketone | 25 parts by weight |
| Toluene | 15 parts by weight | was gravure coated to a post-drying thickness of 10 μm on a PET film (of 50 μm in thickness, Lumirror T60, Toray Industries, Inc.), and a PET film with the surface subjected to releasing treatment (of 50 μm in thickness SP-PET, Tohcello Co., Ltd.)was laminated on the thus obtained coating surface.

Using laser light of 514 nm wavelength, a Lippmann hologram was recorded in the volume hologram layer in the first multilayer film. Then, to fix the Lippmann hologram, the first multilayer film was heated at 80° C. for 5 minutes, and then used a high-pressure mercury lamp (1,000 mJ/cm$^2$).

Second Multilayer Film Comprising Surface Protective Layer 5/Substrate 6

Hakuri Nisu UVC-5W (made by Showa Ink Industries, Inc.) was coated to a post-drying thickness of 1 μm on a substrate (of 50 μm in thickness, Lumirror To60 made by Toray Industries, Inc.), using a gravure coater, thereby forming a surface protective layer on the substrate.

Third Multilayer Film Comprising Thermoplastic Resin Layer 4/Film with the Surface Subjected to Releasing Treatment A water-soluble, heat-sensitive adhesive (EC1700 made by Chuo Rika Kogyo Co., Ltd.) was coated to a post-drying thickness of 2 μm on a PET film with the surface subjected to releasing treatment (of 50 μm in thickness, SP-PET made by Tohcello Co., Ltd.), using a gravure coater.

Fourth Multilayer Film Comprising Heat Seal Layer 3/Releasable Sheet 7

A water-soluble, heat-sensitive adhesive (V200 made by Mitsui chemical Industries, Ltd.) was coated to a post-drying thickness of 2 μm on a PET film with the surface subjected to releasing treatment (of 5 μm in thickness, SP-PET made by Tohcello Co., Ltd.), using a gravure coater, to form a heat seal layer on the releasable sheet.

Fifth Multilayer Film Comprising Thermoplastic Resin Layer 4/Surface Protective Layer 5/Substrate 6

The third multilayer film was dry laminated at 90° C. on its thermoplastic resin layer side over the surface protective layer of the second multilayer film, and the film with the surface subjected to releasing treatment was removed from the third multilayer film, thereby preparing the fifth multilayer film.

Preparation of Hologram Transfer Foil

The PET film with the surface subjected to releasing treatment was removed from the first multilayer film with the hologram recorded therein. Then, the fifth multilayer film was laminated at 100° C. on its thermoplastic resin layer side over the surface of the hologram layer in the first multilayer film, thereby obtaining a sixth multilayer film comprising a PET film/volume hologram layer 2/thermoplastic resin layer 4/surface protective layer 5/substrate 6.

Subsequently, the PET film contiguous to the volume hologram layer was removed, and the fourth multilayer film was laminated at 90° C. on its heat seal layer side over the surface of the volume hologram layer. In this way, the hologram transfer foil of the present invention comprising a releasable sheet 7/heat seal layer 3/volume hologram layer 2/thermoplastic resin layer 4/surface protective layer 5/substrate 6 was fabricated.

The thus obtained hologram transfer foil was found to have a diffraction efficiency of 85.2% and a peak wavelength of 513 nm. After this hologram transfer foil was let standing at room temperature for 7 days, its optical properties were again evaluated. The diffraction efficiency and peak wavelength were 84.4% and 513 nm, respectively; they remained substantially unchanged. Aesthetic deterioration of the hologram layer such as discoloration was not visually observed.

Heat Transfer Using the Hologram Transfer Foil

The releasable sheet 7 was removed from the thus fabricated hologram transfer foil of the present invention, and this hologram transfer foil was laminated on its heat seal layer 3 side over a transparent acrylic film at 130° C. and 0.7 MPa for 1.5 sec. After the laminate was fully cooled, the substrate 6 was removed therefrom, thereby obtaining a volume hologram laminate comprising the transparent acrylic film and, in order therefrom, a heat seal layer 3/volume hologram layer 2/thermoplastic resin layer 4/surface protective layer 5.

After let standing at room temperature for 7 days, this volume hologram laminate was again evaluated for its optical properties. The diffraction efficiency and peak wavelength were 83.9% and 513 nm, and a definite hologram image could be observed with neither brightness drops nor recorded wavelength shifts.

Comparative Example 1

The first multilayer film with the volume hologram recorded therein, the second multilayer film and the fourth multilayer film were provided as in Example 1.

Preparation of Hologram Transfer Foil

The PET film with the surface subjected to releasing treatment was removed from the first multilayer film with the hologram recorded therein. Then, the second multilayer film was laminated at 100° C. on its surface protective layer side over the surface of the hologram layer in the first multilayer film, thereby obtaining a multilayer film comprising a PET film/volume hologram layer/surface protective layer/substrate.

Subsequently, the PET film contiguous to the volume hologram layer was removed, and the fourth multilayer film was laminated at 90° C. on its heat seal layer side over the surface of the volume hologram layer. In this way, a comparative hologram transfer foil comprising a releasable sheet/heat seal layer/volume hologram layer/surface protective layer/substrate was fabricated.

This hologram transfer foil was laminated on a transparent acrylic film as in Example 1. After let standing at room temperature for 7 days, the laminate was evaluated for its optical properties. While the diffraction efficiency was 83.9%, the peak wavelength was largely shifted to 497 nm.

Example 2

Instead of the first multilayer film comprising the PET film/volume hologram-forming layer/PET film with the surface subjected to releasing treatment, another first multilayer film comprising a PET film/relief hologram layer/reflective layer/PET film with the surface subjected to releasing treatment was fabricated as follows.

Exemplary Preparation of Ionizing Radiation-curing Type Urethane-modified Acrylic Resin that is a Relief Hologram-forming Material A 2-liter four-necked flask equipped with a cooler, a dropping funnel and a thermometer was charged with 40 grams of toluene and 40 grams of methyl ethyl ketone (MEK) together with an azo initiator. Then, a mixed solution of 22.4 grams of 2-hydroxyethyl methacrylate (HEMA), 70.0 grams of methyl methacrylate (Mat), 20 grams of toluene and 20 grams of MEK was added dropwise to the charged materials through the dropping funnel over about 2 hours for an 8-hour reaction-at a temperature of 100 to 110° C., after which the reaction product was cooled down to room temperature.

A mixed solution of 27.8 grams of 2-isocyanate ethyl methacrylate (Currens MOT made by Showa Denko K.K.), 20 grams of toluene and 20 grams of methyl ethyl ketone wad added to the reaction product for an addition reaction using dibutyltin laurate as a catalyst. Upon confirmation by TR analysis of the disappearance of an absorption peak of 2,200 $cm^{-1}$ for the isocyanate group in the reaction product, the reaction was completed.

The obtained resin solution was found to have a solid content of 41.0% and a viscosity of 130 mPa·sec. (at 30° C.). As measured by GPC on a standard polystyrene basis, the resin solution had a molecular weight of 35,000 and the average amount of C═C bonds introduced per molecule was 13.8 mol %.

Preparation of Photo-curable Resin Composition

| Preparation of photo-curable resin composition | |
| --- | --- |
| Resin solution produced as mentioned above (on a solid basis) | 100 parts by weight |
| Releasing agent (trimethylsiloxysilicic acid-containing methylpolysiloxane KF-7312 made by the Shin-Etsu Chemical Co., Ltd.) | 1 part by weight |
| Polyfunctional monomer (SR-399 made by Sirtomer Co., Ltd.) | 10 parts by weight |
| Polyester acrylate (M-6100 made by Toa Synthesis Co., Ltd.) | 10 parts by weight |
| Photoinitiator (Irgacure 907 made by Chiba Specialty Chemicals Co., Ltd.) | 5 parts by weight |

Each of the aforesaid components was diluted with methyl ethyl ketone to obtain a composition having a solid content regulated to 20%.

Preparation of Reflection Type Surface Relief Hologram

A release layer (Hakuri Nisu 45-3 made by Show Ink Industries, Inc.) was coated on a polyethylene terephthalate film (PET of 25 μm in thickness, Lumirror T60 made by Toray Industries, Inc.) at a rate of 50 m/min. by means of gravure coating, followed by drying at 100° C. to volatilize off the solvent. In this way, a film comprising a release layer having a post-drying thickness of 1 to 2 $g/m^2$ and a PET layer was obtained.

The photo-curable resin composition obtained as mentioned above was coated on the release layer of the film comprising the release layer/PET layer by means of a roll coater, followed by drying at 100° C. to volatilze off the solvent. In this way, a photosensitive film for replication was obtained with a post-drying thickness of 2 $g/m^2$. The obtained film remained ungummed and so could be stored in a rolled form.

A press stammer prepared from a master hologram made using laser light was set on an emboss roller in a replication system, and the thus obtained photosensitive film for replication was positioned on the feed side of the the system, so that the photosensitive film was thermo-pressed at 170° C. to form a fine relief pattern thereon. Instead of this master hologram, it is acceptable to replicate a hologram from a master hologram using a resin plate and apply the replicated hologram on a cylinder.

Then, the photosensitive film was photo-cured by irradiation with ultraviolet rays from a mercury lamp, and an aluminum layer was subsequently deposited by vacuum evaporation on a fine relief pattern to a thickness of 500 Å, thereby forming a reflection type relief hologram. Finally, a PET film with the surface subjected to releasing treatment was applied over the surface of the relief hologram, thereby fabricating a multilayer film comprising a PET/release layer/surface relief hologram layer/reflective layer/PET film with the surface subjected to releasing treatment.

Preparation of Hologram Transfer Foil

The PET film contiguous to the release layer was removed from the multilayer film with the hologram recorded therein. Then, the fifth multilayer film obtained in Example 1 was laminated at 100° C. on its thermoplastic resin layer over the surface of the hologram layer of the multilayer film, thereby obtaining a multilayer film comprising a PET film with the surface subjected to releasing treatment/reflective layer/surface relief hologram layer 2/thermoplastic resin layer 4/surface protective layer 5/substrate 6.

Then, the PET film with the surface subjected to releasing treatment was removed from the multilayer film, and the fourth multilayer film obtained in Example 1 and comprising the heat seal layer/releasable sheet was laminated at 100° C. on its heat seal layer side over the surface of the reflective layer of the multilayer film. In this way, the hologram transfer foil of the present invention comprising a releasable sheet 7/heat seal layer 3/reflective layer/hologram layer 2/thermoplastic resin layer 4/surface protective layer 5/substrate 6 was obtained.

The obtained hologram transfer layer, from which the releasable sheet was removed, was heat transferred onto a polyvinyl chloride substrate at 160° C. and 0.7 MPa for 0.5 seconds. The peel strength between the surface protective layer and the substrate was 0.7 kgf/25 mm, indicating that the substrate was of satisfactory releasability.

Comparative Example 2

Example 2 was repeated with the exception that the second multilayer film obtained in Example 1 and comprising the surface protective layer/substrate was used in place of the fifth multilayer film, thereby preparing a multilayer comprising a PET film with the surface subjected to releasing treatment/reflective layer/surface relief hologram layer/surface protective layer/substrate.

Then, the PET film with the surface subjected to releasing treatment was removed from the multilayer film, and the fourth multilayer film obtained in Example 1 and comprising the heat seal layer/releasable sheet was laminated at 100° C. on its heat seal layer side over the surface of the reflective layer of the multilayer film. In this way, a hologram transfer foil comprising a releasable sheet/heat seal layer/reflective layer/surface relief hologram layer/surface protective layer 5/substrate 6 was obtained.

The obtained hologram transfer layer, from which the releasable sheet was removed, was heat transferred onto a polyvinyl chloride substrate at 160° C. and 0.7 MPa for 0.5 seconds. The peel strength of the substrate with respect to the surface protective layer was as large as 0.13 kgf/25 mm. AS a result, a cohesive breakdown of the surface protective layer occurred upon a release of the substrate from the surface protective layer, probably because the migration of the low-molecular-weight component from the surface relief hologram layer into the surface protective layer might impede the smooth release of the substrate from the surface protective layer Example 3

The first multilayer film comprising the PET film/hologram-recorded volume hologram layer/PET film with the surface subjected to releasing treatment and the second multilayer film comprising the surface protective layer 5/substrate 6 were prepared as in Example 1. However, the third and fourth multilayer films were prepared as follows.

Third Multilayer Layer Comprising Thermoplastic Resin Layer 4/Film with the Surface Subjected to Releasing Treatment A heat-sensitive adhesive (Nipporan 3038 made by Nippon Polyurethane Co. Ltd. with a softening point of 135° C.) was coated on a PET film with the surface subjected to releasing treatment (of 50 μm in thickness, SP-PET made by Tohcello Co., Ltd.) to a post-drying thickness of 2 μm by means of a gravure coater.

Fourth Multilayer Film Comprising Heat Seal Layer 3/Releasable Sheet 7

A heat-sensitive adhesive (V200 made by Mutsui Chemical Industries, Ltd. with a softening point of 85° C.) was coated to a post-drying thickness of 2 μm on a PET film with the surface subjected to releasing treatment (of 50 μm in thickness, SP-PET made by Tohoello Paper Co., Ltd.), using a gravure coater, to laminate the heat seal layer on the releasable sheet.

Fifth Multilayer Film Comprising Thermoplastic Resin Layer 4/Surface Protective Layer 5/Substrate 6

The third multilayer film was dry laminated at 140° C. on its thermoplastic resin layer side over the surface protective layer of the second multilayer film in Example 1, and the film with the surface subjected to releasing treatment was removed from the third multilayer film, thereby preparing the fifth multilayer film.

Preparation of Hologram Transfer Foil

The PET film with the surface subjected to releasing treatment was removed from the first multilayer film with the hologram recorded therein. Then, the fifth multilayer film was laminated at 140° C. on its thermoplastic resin layer side over the surface of the hologram layer in the first multilayer film, thereby obtaining a sixth multilayer film comprising a PET, film/volume hologram layer 2/thermoplastic resin layer 4/surface protective layer 5/substrate 6.

Subsequently, the PET film contiguous to the volume hologram layer was removed, and the fourth multilayer film was laminated at 90° C. on its heat seal layer side over the surface of the volume hologram layer. In this way, the hologram transfer foil of the present invention comprising a releasable sheet 7/heat seal layer 3/volume hologram layer 2/thermoplastic resin layer 4/surface protective layer 5/substrate 6 was fabricated.

The releasable sheet was released from the obtained hologram transfer foil. Then, this hologram transfer foil was laminated on a polyvinyl chloride card at 130° C. and 0.7 MPa for 1.5 seconds. The hologram transfer foil could be laminated on and in alignment with the polyvinyl chloride card; it had satisfactory lamination capability. Just after the lamination (after the lapse of about 2 seconds), the substrate 6 was removed to observe the release interface. It was consequently found that the substrate 6 can be released from the surface layer 5 with no difficulty. This means that the inventive hologram transfer foil is improved in productivity.

Comparative Example 3

A hologram transfer foil was prepared as in Example 3 with the exception that the third and fourth multilayer films were prepared as mentioned below.

Third Multilayer Film Comprising Thermoplastic Resin Layer 4/Film with the Surface Subjected to Releasing Treatment A heat-sensitive adhesive (EC1700 made by Chuo Rika Co., Ltd. with a softening point of 85° C.) was coated on a PET film with the surface subjected to releasing treatment (of 50 μm in thickness, SP-PET made by Tohcello Paper Co., Ltd.) to a post-drying thickness of 2 μm by means of a gravure coater, Fourth Multilayer Film Comprising Heat Seal Layer 3/Releasable Sheet 7

A heat-sensitive adhesive (EC1700 made by Chuo Rika Co., Ltd. with a softening point of 85° C.) was coated to a post-drying thickness of 2 μm on a PET film with the surface subjected to releasing treatment (of 50 μm in thickness, SP-PET made by Tohcello Paper Co., Ltd.), using a gravure coater, to laminate the heat seal layer on the releasable sheet.

As in Example 3, the hologram transfer foil was transferred onto a polyvinyl chloride card. This hologram could be laminated on and in alignment with the polyvinyl chloride card; it had improved lamination capability. Just after the lamination (after the lapse of about 2 seconds), the substrate 6 was removed to observe the release interface. AS a result, the thermoplastic resin layer 4 was found to be released off the hologram layer 2. After the lapse of a few seconds, the temperature of the transferred product was lowered for removal of the substrate 6. The substrate 6 could be perfectly released from the surface protective film. However, some long time was needed for one transfer cycle. In other words, this hologram transfer foil was found to have a problem in connection with productivity.

Examples 4–5 and Comparative Examples 4–7

The third multilayer film was prepared as in Example 3 with the exception that the materials shown in Table 1, given below, were used for the thermoplastic resin in the third multilayer film comprising thermoplastic resin layer 4/film with the surface subjected to releasing treatment. Under otherwise the same conditions as in Example 3, hologram transfer foils were prepared.

Each of the obtained hologram transfer foils was laminated on a polyvinyl chloride card as in Example 3 yet under the transfer conditions shown in Table 2, given below. Just after the lamination (after the lapse of about 2 seconds), the substrate 6 was removed from the surface protective layer 5 to observe the release interface. The results of evaluation of the release surface are also shown in Table 2.

In Table 2, ◯◯ indicates that the substrate 6 can be released from the surface layer 5 with no difficulty just after the lamination (after the lapse of about 2 seconds), ◯ indicates that there is no problem in connection with the releasability of the substrate 6 from the surface layer 5 just after the lamination (after the lapse of about 2 seconds), but some long time is needed for one transfer cycle, Δ indicates that there is some problem in connection with the releasability of the substrate 6 from the surface layer 5 just after the lamination (after the lapse of about 2 seconds), and X indicates that there is a grave problem in connection with the releasability of the substrate 6 from the surface layer 5 just after the lamination (after the lapse of about 2 seconds).

TABLE 1

| | Material | Softening Point |
|---|---|---|
| Ex. 4 | AC3100, Chuo Rika | 90° C. |
| Ex. 5 | EC909, Chuo Rika | 100° C. |
| Comp. Ex. 4 | EV270, Mitsui Chemicals | 41° C. |
| Comp. Ex. 5 | U206, Soken Chemicals | 60° C. |
| Comp. Ex. 6 | EC1200, Chuo Rika | 75° C. |
| Comp. Ex. 7 | AD1709, Toyo Morton | 80° C. |

TABLE 2

| | Lamination Temp. | | | Results of Transfer |
|---|---|---|---|---|
| Ex. 4 | 100° C. | 130° C. | 1.5 sec. | ◯ |
| Ex. 5 | 110° C. | 130° C. | 1.5 sec. | ◯◯ |
| Comp. Ex. 4 | 50° C. | 130° C. | 1.5 sec. | X |
| Comp. Ex. 5 | 70° C. | 130° C. | 1.5 sec. | X |
| Comp. Ex. 6 | 50° C. | 130° C. | 1.5 sec. | X |
| Comp. Ex. 7 | 70° C. | 130° C. | 1.5 sec. | Δ |

From Table 2, it is appreciated that when the softening point of the thermoplastic resin layer is at least 5° C. higher than that of the heat seal layer, improved transferability is obtained.

Example 6

The first multilayer film comprising a PET film/relief hologram layer/reflective layer/PET film with the surface subjected to releasing treatment was prepared as in Example 2.

Preparation of Hologram Transfer Foil

The PET film with the surface subjected to releasing treatment was removed from the first multilayer film with the hologram recorded therein. Then, the fifth multilayer film obtained in Example 5 was laminated at 90° C. on its thermoplastic resin layer over the surface of the hologram layer of the multilayer film, thereby obtaining a sixth multilayer film comprising a PET film/reflective layer/surface relief hologram layer 2/thermoplastic resin layer 4/surface protective layer 5/substrate 6.

Then, the PET film contiguous to the reflective layer was removed from the multilayer film, and the fourth multilayer film obtained in Example 3 was laminated at 90° C. on its heat seal layer side over the surface of the reflective layer of the multilayer film in this way, the hologram transfer foil of the present invention comprising a releasable sheet 7/heat seal layer 3 (having a softening point of 85° C.)/reflective layer/hologram layer 2/thermoplastic resin layer 4 (having a softening point of 135° C.)/surface protective layer 5/substrate 6 was obtained.

The obtained hologram transfer layer, from which the releasable sheet was removed, was heat transferred onto a polyvinyl chloride substrate at 160° C. and 0.7 MPa for 1.5 seconds. The hologram transfer foil could be laminated on and in alignment with the polyvinyl chloride card; it had satisfactory lamination capability. Just after the lamination (after the lapse of about 2 seconds), the substrate 6 was removed to observe the release interface. It was consequently found that the substrate 6 can be released from the surface layer 5 with no difficulty. This means that the inventive hologram transfer foil is improved in productivity.

Example 7

Preparation of the First Multilayer Film Comprising PET Film/Volume Hologram-forming Layer/PET Film with the Surface Subjected to Releasing Treatment A hologram-recording material comprising 500 parts by weight of a polymethyl methacrylate resin (having a molecular weight of 200,000), 5 parts by weight of 3,9-diethyl-3'-carboxymethyl-2,2'-thiacarbocyanine iodine salt, 60 parts by weight of diphenyliodonium hexafluoroantimonate, 800 parts by weight of 2,2-bis[4-(acryloxydiethoxy)phenyl]propane and 800 parts by weight of pentaerythritol polyglycidyl ether was coated on a PET film to a post-drying thickness of 10 μm, and a PET film (of 50 μm in thickness, made by Tohcello Co., Ltd.) with the surface subjected to releasing treatment (of 50 μm in thickness, made by Tohcello Co., Ltd.) was applied on the obtained coating surface, thereby preparing the first multilayer film comprising a PET film/hologram-recording material/releasable PET film.

Using laser light of 514 nm wavelength, a Lippmann hologram was recorded in the volume hologram layer in the first multilayer film, and the volume hologram layer was then heated at 80° C. for 5 minutes to fix the Lippmann hologram using a high-pressure mercury lamp (1,000 mJ/cm$^2$).

Then, the fourth multilayer film comprising a PET film with the surface subjected to releasing treatment/uncolored heat seal layer/colored layer/uncolored heat seal layer/release sheet 7 was prepared instead of the fourth multilayer film of Example 1 comprising heat seal layer 3/releasable sheet 7.

Preparation of Multilayer Film a Comprising PET Film with the Surface Subjected to Releasing Treatment/Uncolored Heat Seal Layer Sixty (60) parts by weight of a water-soluble thermoplastic resin, i.e., an ethylene-vinyl acetate copolymer (EC-1700 made by Chuo Rika Kogyo Co., Ltd.) were dissolved in 40 parts by weight of water. The resultant coating solution was coated on a releasable PET film (of 50 μm in thickness, SP-PET made by Tohcello Co., Ltd.) by means of a gravure coater, thereby obtaining a multilayer film including an uncolored heat seal layer having a post-drying thickness of 2 μm.

Preparation of Multilayer Film b Comprising Release Sheet 7/Uncolored Heat Seal Layer/Colored Layer Fifty (50) parts by weight of an ethylene-vinyl acetate copolymer (AD1790-15 made by Toyo Morton Co., Ltd.) were dissolved in 50 parts by weight of toluene, and the resultant coating solution was coated on a releasable sheet (of 50 μm in thickness, SP-PET made by Tohcello Co., Ltd.) by means of a gravure coater to obtain an uncolored heat seal layer of 2 μm in post-drying thickness Then, aluminum was deposited by vacuum evaporation on the uncolored heat seal layer to obtain a reflective metal thin film of 100 nm in thickness, thereby obtaining a multilayer film.

The thus obtained multilayer film b was laminated on its the multilayer film a, thereby preparing the fourth multilayer film comprising a PET film with the surface subjected to releasing treatment/uncolored heat seal layer/colored layer/uncolored heat seal layer/release sheet 7.

Preparation of Hologram Transfer Foil

The PET film with the surface subjected to releasing treatment was removed from the first multilayer film with the hologram recorded therein. Then, the fifth multilayer film prepared in Example 1 was laminated at 100° C. on its thermoplastic resin layer side over the surface of the hologram layer in the first multilayer film, thereby obtaining the sixth multilayer film comprising a PET film/volume hologram layer 2/thermoplastic resin layer 4/surface protective layer 5/substrate 6.

Subsequently, the PET film contiguous to the volume hologram layer was removed, and the aforesaid fourth multilayer film, from which the PET film with the surface subjected to releasing treatment was heat laminated at 100° C. on its heat seal layer side over the surface of the volume hologram layer.

In this way, the hologram transfer foil of the present invention comprising a release sheet 7/heat seal layer 3 on which the uncolored heat seal layer, colored layer and uncolored heat seal layer were laminated in this order/volume hologram layer 2/thermoplastic resin layer 4/surface protective layer 5/substrate 6 was fabricated.

The thus obtained hologram transfer foil was found to have a diffraction efficiency of 70.6% and a peak wavelength of 512 nm. After this hologram transfer foil was let standing at room temperature for 7 days, its optical properties were again evaluated. The diffraction efficiency and peak wavelength were 69.9% and 512 nm, respectively; they remained substantially unchanged. Aesthetic deterioration of the hologram layer such as discoloration was not visually observed Heat Transfer Using the Hologram Transfer Foil The releasable sheet 7 was removed from the thus fabricated hologram transfer foil of the present invention, and this hologram transfer foil was laminated on its heat seal layer 3 side over a transparent acrylic film at 130° C. and 0.7 MPa for 1.5 sec. After the laminate was fully cooled, the substrate 6 was removed therefrom, thereby obtaining a volume hologram laminate comprising the transparent acrylic film and, in order therefrom, a heat seal layer 3 on which the uncolored heat seal layer, colored layer and uncolored heat seal layer were laminated in this order/volume hologram layer 2/thermoplastic resin layer 4/surface protective layer 5.

After let standing at room temperature for 7 days, this volume hologram laminate was again evaluated for its optical properties. The diffraction efficiency and peak; wavelength were 70.3% and 513 nm, and a definite hologram of improved contrast could be observed with neither brightness drops nor recorded wavelength shifts. And, the excellent hologram in contrast could be also observed because of having a colored layer.

What we claim is:

1. A volume hologram transfer foil comprising a multilayer structure, which comprises a substrate, a surface protective layer formed by coating a surface protective layer-forming ink, a thermoplastic resin layer comprising a coating layer in which a heat-sealable, water-soluble adhesive agent is dissolved or dispersed in water, a volume hologram layer in which a volume hologram is recorded in a hologram recording material comprising a matrix polymer, a photo-polymerizable compound, a photo-polymerization initiator and a sensitizing dye and a heat seal layer laminated thereon in this order, wherein:

said thermoplastic resin layer has a softening point of 55° C. to 200° C., said heat seal layer has a softening point of 50° C. to 195° C., the softening point of said thermoplastic resin layer is at least 5° C. higher than the softening point of said heat seal layer, and when said volume hologram transfer foil is applied on said heat seal layer side to an application member, a peel force between said substrate and said surface protective layer is smaller than that between adjacent layers in said multilayer structure.

2. The volume hologram transfer foil according to claim 1, wherein said thermoplastic resin layer and said heat seal layer are each dry laminated on said volume hologram layer.

3. The volume hologram transfer foil according to claim 1, which further comprises a releasable sheet laminated on a surface of said heat seal layer.

* * * * *